Patented Apr. 23, 1946

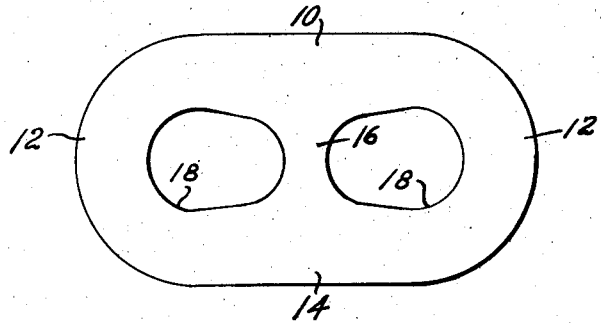
Fig. 1
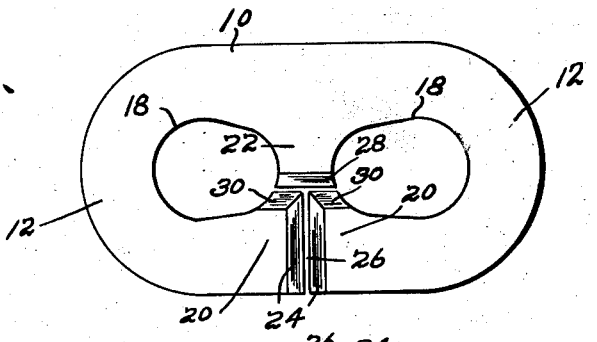
Fig. 2
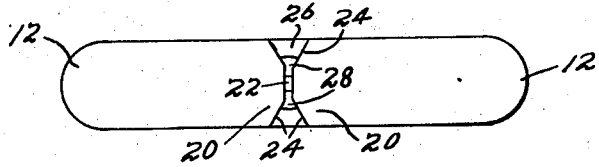
Fig. 3
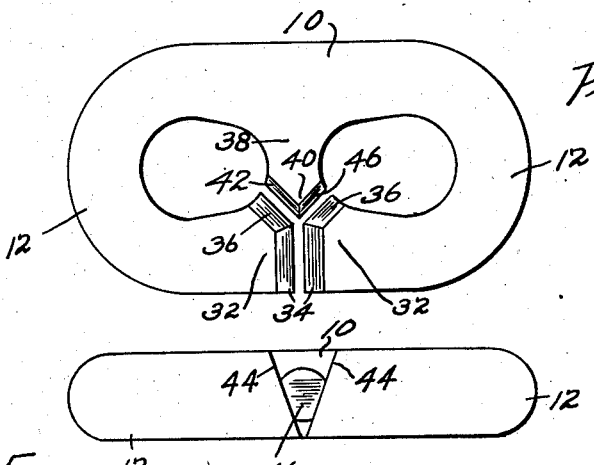
Fig. 4
Fig. 5
INVENTOR.
HENRY ST. PIERRE
BY Charles R. Fay
atty.

2,398,898

UNITED STATES PATENT OFFICE 2,398,898

SOLID FORGED LOCKING STUD LINK

Henry St. Pierre, Worcester, Mass.

Application October 14, 1943, Serial No. 506,233

10 Claims. (Cl. 59—84)

This invention relates to new and improved solid forged locking stud links for connecting the solid links in chains.

Objects of the invention include the provision of a locking stud link comprising a solid side having arms extending from the ends thereof and reversely curved to form an interrupted side for the link, with the ends of the arms positioned in closely spaced relation, there being a stud secured to or formed integrally with the solid side of the link and extending toward the interrupted side, the ends of the arms terminating in enlarged heads which project inwardly of the link toward the stud and form a part thereof when the link is finished, said head having bevelled edges complementary to each other and forming a groove between the heads; said stud and heads being formed in a similar manner to provide a groove between the stud and the heads, said grooves providing improved means for the reception of molten metal for welding the heads and studs together in a unitary mass in a single operation, so that the link will be completed with the ends of the stud in similar form whereby the link will be symmetrical and will have similar properties in strength at the junctions of the stud with both the solid and interrupted sides of the link.

Other objects and advantages of the invention will appear hereinafter, reference being had to the accompanying drawing, in which Fig. 1 is a plan view of a link as it appears in finished form;

Fig. 2 is a plan view of one form of link prior to welding;

Fig. 3 is an edge view of the link of Fig. 2;

Fig. 4 is a plan view of a modified form of link; and

Fig. 5 is an edge view of a still further form of link.

Locking links of the type disclosed herein are used in heavy duty chains for joining together solid links of similar type but incapable of being opened to receive other links of a chain. In this respect attention is drawn to my copending application Serial No. 449,931, filed July 6, 1942. The present case is directed to an improvement in the solid forged locking link therein disclosed.

In its finished form, this link comprises a solid side 10, end arms 12, a side 14 opposite from side 10, and a central stud 16 forming eyes 18 for the reception of other links of like character. It will be seen that this link is symmetrical about a longitudinal or major axis and also about a transverse or minor axis, and that the stud 16 joins sides 10 and 14 similarly at least in so far as the finished link is concerned, and there are no corners or shoulders which would be liable to crack under stress. It will also be noted that this section of the link in the region of the stud is greatly in excess of the section in the end arms and for this reason the eyes 18 are narrower adjacent the stud than at a point thereof adjacent the end arms 12. This form increases the physical properties of the link.

Fig. 2 shows a blank which may be forged substantially as shown. It is preferred to form the blank by means of forging from a solid bar in dies which will form the blank by means of a hammer. Arms 12 will be seen to terminate closely adjacent each other in enlarged heads 20, the exterior surfaces of which conform to the sides 10 and 14 as finished, the head 20 extending inwardly toward the stud blank 22. The adjacent ends of heads 20 are provided with cut-away portions or like irregular surfaces which in the present case are illustrated as bevels 24. These bevels together form a groove 26 for a purpose to be described.

Stud 22 may be of any desired section but in this case it is formed at its ends with a cut-away surface 28 which corresponds in general to the surfaces 24 but extends at right angles thereto. The enlarged heads 20 at their interior surfaces are provided with cut-away surfaces 30, and it will be seen that surface 28 in conjunction with surfaces 30 form a groove similar to that at 26 but at a right angle thereto.

These grooves may appear at both sides of the link as shown in Fig. 3 or they may be enlarged and appear substantially at one side only of the link as shown in Fig. 5. In the Fig. 2 modification the grooves together form a T-shaped groove at each side of the link. Incidentally where the surfaces 24, 28 and 30 are formed by forging it has been found that it is preferable to cut out the bottoms of the groove by means of a cutting tool rather than to form the heads 20 and studs 22 in spaced relation such as is shown in Fig. 2.

When the solid links are positioned in the eyes 18, the link of Fig. 2 is held in position to receive molten welding metal in the grooves and this metal may be said to be in effect cast into the grooves as a mold. However, the molten metal may also be positioned in the grooves by means of arc welding. The molten metal will be of a nature to firmly weld the enlarged heads 20 and stud 22 together in a unitary mass and the weld metal may be finished off to conform to the finished link as shown in Fig. 1. By this method the links of Fig. 2 will be made to appear like the links of Fig. 1, and therefore all the links in the chain will be exactly the same in appearance. The method of welding herein disclosed also provides that the weld area will be as strong as the equivalent area in the solid side 10 of the link because of the compound grooves formed by the bevels in the heads and in the studs.

In Fig. 4 there is shown a modification of the Fig. 2 link. In this case the arms 12 are provided with enlarged heads 32 and beveled edge surfaces 34 which, however, are not straight as in Fig. 2 but merge with an angled surface 36. The stud blank 38 is provided with a point 40 and beveled surfaces 42 complementary to those at 36. These surfaces may also appear at both sides of the link or at one side only thereof, and the process is the same as above described with reference to Fig. 2. In this case, however, the weld will be in the form of a Y rather than in the form of a T.

In the Fig. 5 illustration I have shown the several surfaces 44 in the enlarged head extending across the link from side to side thereof and the numeral 46 illustrates a beveled end for the stud, there being corresponding surfaces for cooperation with surface 46 to form a V-shaped groove extending completely through the link in a manner similar to the surfaces at 44.

It will be seen that this invention presents an improved stud locking link having a strong weld area due to the formation of the beveled surfaces in the enlarged head, the latter forming in each case a part of the finished stud and allowing for a finished link having a symmetrical stud as shown in Fig. 1.

Having thus described my invention and the advantages thereof, I do not wish to be limited to the details herein disclosed, otherwise than as set forth in the claims, but what I claim is:

1. Method of making locking stud links for chain, comprising the steps of forming a link having a solid side and a pair of arms extending therefrom towards each other to form an interrupted side, forming a stud extending from the solid side towards the interruption, forming enlarged heads at the terminations of the arms in the region of the stud, forming a groove between the heads, forming a groove between the stud and both heads, and depositing molten metal in said grooves to weld the heads and stud together.

2. The method recited in claim 1 wherein the metal depositing step is substantially simultaneous as to heads and stud.

3. A blank for forming a stud link for chains comprising a solid side, arms extending from said solid side generally toward each other to form the other side of the link, a stud extending from the solid side and terminating in close proximity to the ends of the arms, said arm ends having enlarged heads, said heads being close together and having adjacent bevel surfaces together forming a groove between the heads, said stud and adjacent areas of said heads having complementary bevel surfaces forming a groove between the studs and head.

4. The link of claim 3 in which said grooves form a T.

5. The link of claim 3 in which said grooves form a Y.

6. The link of claim 3 in which said grooves all appear at one side only of the link.

7. The link of claim 3 in which said grooves appear at both sides of the link.

8. The link of claim 3 in which said heads extend toward the stud and form a part thereof.

9. A locking stud link comprising a solid side, arms extending from said solid side into closely spaced relation forming an interrupted side, a stud on the solid side extending toward the interrupted side, said arms terminating in enlarged heads extending toward the stud, beveled surfaces on the extremities of said heads, said bevels together forming a groove, further bevels on said heads at angles relative to said first named bevels, and a bevel in the stud cooperating with the further bevels in the head to form a groove located at an angle to the first named groove, said grooves forming means to receive molten metal.

10. The method of claim 1 wherein the grooves are cut after forging.

HENRY ST. PIERRE.